(12) United States Patent
Wilson et al.

(10) Patent No.: US 6,589,442 B1
(45) Date of Patent: Jul. 8, 2003

(54) DUST CONTROL COMPOSITION

(75) Inventors: Walter Wilson, Calgary (CA); Roy Baker, Chestmere (CA); Vita Martez, Calgary (CA)

(73) Assignee: Q-X Enviro Products Ltd., Calgary (CA)

( * ) Notice: Subject to any disclaimer, the term of this patent is extended or adjusted under 35 U.S.C. 154(b) by 283 days.

(21) Appl. No.: 09/636,326

(22) Filed: Aug. 10, 2000

(51) Int. Cl.$^7$ .............................. C09K 3/22; C09K 3/00
(52) U.S. Cl. ..................... 252/70; 252/88.1; 252/384
(58) Field of Search .................... 252/70, 88.1, 384

(56) References Cited

U.S. PATENT DOCUMENTS

| | | |
|---|---|---|
| 2,399,464 A | 4/1946 | Butcher |
| 2,399,465 A | 4/1946 | Butcher |
| 4,362,568 A | 12/1982 | Ostermeyer |
| 4,417,992 A | 11/1983 | Bhattacharyya et al. |
| 4,822,425 A * | 4/1989 | Burch ..................... 106/273.1 |
| 5,603,745 A * | 2/1997 | Pettersen et al. .............. 71/58 |
| 6,355,083 B1 * | 3/2002 | Ogzewalla ................... 71/33 |

FOREIGN PATENT DOCUMENTS

| | | | |
|---|---|---|---|
| EP | 0 270 199 A3 | 6/1988 | |
| JP | 55023215 A * | 8/1978 | ............. E01C/7/35 |
| SU | 1054399 A | 11/1983 | |

* cited by examiner

*Primary Examiner*—Mark Kopec
*Assistant Examiner*—Derrick G. Hamlin
(74) *Attorney, Agent, or Firm*—Summa & Allan, P.A.

(57) ABSTRACT

A stable concentrated dust control composition comprises a mixture of crude tall oil and vegetable oil emulsified in water. The dust control composition is completely organic, non-corrosive, non-flammable, non-toxic, ecologically safe, readily dilutable with water, safe to use, easy to apply to a desired surface and environmentally responsible. The water soluble formula may be designed to penetrate into the surfaces to bind with surface materials to create a dust free durable surface safe to motorists. The composition suppresses dust, so it is unable to be picked up and be carried away by wind and water, therefore preventing soil erosion and damage to field crops. The composition also reduces airborne dust that carries disease causing pollutants that are transported to distant communities.

17 Claims, No Drawings

DUST CONTROL COMPOSITION

FIELD OF THE INVENTION

The present invention relates to a dust control composition. More particularly, the present invention is directed to an environmentally friendly dust control composition which is applied to road surfaces.

BACKGROUND OF THE INVENTION

Dust clouds cause poor visibility and dangerous driving conditions creating a safety hazard for drivers. Dust clouds also ultimately slow down production rates around mining complexes, industrial and construction sites. In addition, dust clouds cause allergies related to the respiratory tract resulting in animal and human health problems in communities. In order to minimize such eventualities, liquid compositions have been developed for controlling or settling dust on surfaces such as roadways. Such compositions have comprised agents such as motor oil, various lignosulfonates, waste petroleum oil, magnesium or calcium salt compositions and water.

U.S. Pat. No. 2,399,464 discloses a dust preventative composition comprising petroleum distillate, naphthenic acid, a sodium salt of a sulfonated higher alcohol, water and a germicide.

U.S. Pat. No. 2,399,465 discloses a dust preventative composition comprising a petroleum distillate oil, oleic acid and a metal naphthenate.

U.S. Pat. No. 4,417,992 discloses a dust control composition comprising a liquid dispersion of a highly branched water swellable polymer of acrylamide or an acrylamide-acrylic acid copolymer, cross-linked with a multifunctional unsaturated monomer containing more than one ethylenically unsaturated group.

U.S. Pat. No. 4,362,568 discloses an essentially petroleum distillate-free prime coat emulsion comprising asphalt cement, tall oil, tall oil fractions or mixtures thereof, a base and water.

EP Patent 0 270 199 discloses a composition for controlling dust migration comprising an emulsion of liquid asphalt, a ligno-sulfonic acid salt solution and water.

Russian Patent 1054399 discloses a road surface composition comprising tall pitch as an organic binder and tall oil to provide a dust control agent.

While these compositions provide varying degrees of dust control, they are not either generally effective since they are either easily washed away by rain due to lack of penetration or they contain polluting contaminants that leach into surface and ground water causing serious human health and environmental concerns.

There is therefore a need to develop an improved and effective dust control composition that is environmentally friendly as an alternative to prevalent market products and which effectively fosters a sustainable dust abatement practice.

SUMMARY OF THE INVENTION

In accordance with an aspect of the present invention there is provided a dust control composition which is completely organic, non-corrosive, nonflammable, non-toxic, ecologically safe, readily dilutable with water, safe to use, easy to apply to a desired surface and environmentally responsible. Preferably, the composition is applied to unpaved gravel road surfaces.

The composition according to an aspect of the present invention provides a dust-free, compact gravel surface which may resist erosion, weathering, spring breaks and frost heaves depending on the gravel composition. Furthermore, the dust control composition of the present invention is cost effective to make and use compared to current road dust abatement methods. The composition is easily sprayed onto desired surfaces and requires minimal re-application requirements under desirable weather conditions. The water-soluble formula may be designed to penetrate into surfaces to bind with surface materials to create a dust-free durable surface safe to motorists. The composition suppresses dust so it is unable to be picked up and be carried away by wind and water thereby preventing soil erosion and damage to field crops. The use of the composition also reduces airborne dust that carries disease causing pollutants that are transported to distant communities.

According to an aspect of the present invention, a stable dust control composition comprises:

a mixture of crude tall oil and vegetable oil emulsified in water.

According to an aspect of the present invention, a stable dust control composition comprises:

an oil mixture anywhere from about 5% to 95% crude tall oil and anywhere from about 5% to 95% vegetable oil, said oil mixture being emulsified in a range of ratios of from about 40:60 to about 25:75 oil mixture to water with up to about 4% to 6% by weight of the oil mixture of a base.

The composition can be further diluted with water as desired.

According to a further aspect of the present invention, a method for making a stable dust control composition comprises;

providing a mixture of anywhere from about 5% to 95% crude tall oil and anywhere from about 5% to 95% vegetable oil;

emulsifying said mixture in a range of ratios of from about 40:60 to about 25:75 with water using up to about 4% to 6% base by weight of the oil mixture to provide a stable emulsion.

The method may additionally comprise the step of further diluting the stable emulsion.

According to yet a further aspect of the present invention, a method for creating a dust-free, compact surface, comprises the steps of;

applying a mixture of anywhere from about 5% to 95% crude tall oil and anywhere from about 5% to 95% vegetable oil, emulsified in a range of ratios of from about 40:60 to about 25:75 oil mixture to water with up to about 4% to 6% by weight of the oil mixture of base to a desired surface; and upon field application, allowing the mixture to cure.

DETAILED DESCRIPTION OF THE INVENTION

The invention provides an effective and environmentally friendly dust control composition that can be applied onto a variety of soil or gravel surfaces to control dust as well as to compact and stabilize the top or base surface. The composition is a water-dilutable formula that binds with surface materials to create a dust-free surface that resists particulate emission from traffic and does not erode after curing. The formulation may be designed to provide most preferably a dust free compact surface.

The composition is designed to stabilize dust particles and create a longer-lasting dust free environment and thus reduces the number of reapplications. Annual maintenance applications of the composition to a surface actually improves the road surface. As such, use of the composition is cost-effective as it reduces the use of equipment and labor normally required to maintain a conventional dust control program through sustainability.

The dust control composition of the present invention comprises a blend of crude tall oil with a vegetable oil which is then emulsified in water using a base. Emulsification is most preferably carried out by saponifying, in part, the oil mixture to provide an emulsion of oil in water. It is appreciated that other techniques for emulsifying the oil in water are contemplated such as the use of a non-toxic surfactant. It has been surprisingly found that the vegetable oil enhances the penetration of the composition into the road surface. The resultant product is a concentrated emulsion that can be applied in concentrated or in a range of dilutions. The blend of crude tall oil with a vegetable oil is preferably at a ratio of about 80:20 tall oil to vegetable oil. Although it is appreciated that the ratio may favor lower or higher amounts of vegetable oil as determined by the application. The determining factors may vary greatly for the relative amounts of tall oil to vegetable oil. For the higher concentrations of tall oil, the amount of vegetable oil needed to ensure penetration of the tall oil into the particulate matter, for example, as applied to a road surface. On the other hand, there may be applications where one does not want the surface to harden up, so that considerably higher amounts of vegetable oil are used. For example, the higher levels of vegetable oil may be applied to gravel piles, sand piles, slag piles and the like to keep windblown dust to a minimum. In addition, applications of the composition which may involve areas where animals are grazing, the higher vegetable oil compositions are preferred. A typical composition emulsified in water may include anywhere from about 5% to 95% by weight of tall oil and the balance being anywhere from about 5% to 95% by weight of the vegetable oil. This results in tall oil to vegetable oil ratios which may range 5:95 up to 95:5.

The tall oil used in the composition of the present invention is a crude by-product from the Kraft paper-making process. Tall oil is made up of a range of C18 to C24 long chain fatty acids. The vegetable oil is a lighter oil and preferably contains C16 to C22 long chain fatty acids. A preferred example of a light oil includes canola oil such as crude canola oil. Mixing the vegetable oil with the crude tall oil ensures a deep penetration of the composition into the granular material of the road surface to minimize dust. The preferred agent for neutralizing or saponifying the oil in part is potassium hydroxide, but any strong base, such as sodium hydroxide, is suitable for use in the composition. This provides a concentrate which can be diluted further for application to the roads. Emulsifying the oil due to a partial saponification or neutralization of the oils allows for its dilution with water. The emulsified oil is mixed with water in range of ratios of from about 40:60 to about a 25:75 ratio. The amount of potassium hydroxide to neutralize in part the oils is preferably less than 10% by weight oil and most preferably provided in a range of about 3% to 10% by weight. One skilled in the art would readily comprehend that the extent of neutralization required to emulsify the oil in water is sufficient to form a stable oil in water emulsion without the production of excessive foaming.

As herein described, crude tall oil, a mixture of the resin and fatty acids, is produced as a chemical by-product of the Kraft pulping process and is preferred for use in the composition and method of the present invention. Briefly, in the Kraft pulping process, wood chips are fed into a digester and a "white" cooking liquor containing sodium hydroxide (NaOH) and sodium sulfide ($Na_2S$) is added. The contents are then heated according to a predetermined schedule to complete the cooking reactions, wherein the resin acids and fatty acids are released from the wood chips. The resulting cooked pulp is separated from the residual cooking liquor, known as black liquor, in a brown stock washing process. The sodium salts of the resin acids and fatty acids, commonly referred to as tall oil soap or "black liquor soap", are suspended in the black liquor. The wood pulp is treated further in the papermaking process to produce papers of various grades.

One skilled in the art of making Kraft paper will recognize that there are various techniques for recovering tall oil soap from the Kraft black liquor. The separated tall oil soap is then normally acidulated with sulfuric acid to form crude tall oil, which can be refined by vacuum fractionation to form tall oil fatty acids and tall oil resin. In general, tall oil comprises about 30–35% fatty acids, about 35–60% resin and resin acids and about 5–10% unsaponifiables. One skilled in the art would also recognize that any method can be used to obtain crude tall oil for use in the composition and method of the present invention. It is also understood that any oil, having equivalent properties to crude tall oil, can be used in the composition and method of the present invention.

The preferred vegetable oil for use in the present invention is canola oil. Canola oil has the lowest level of saturated fatty acids of all vegetable oils. Canola contains a mixture of C12 to C22 fatty acids. Although canola oil is most preferred, it is understood by one skilled in the art that any vegetable oil of similar or equivalent fatty acid profile can also be used in the composition and method of the present invention. Suitable oils for use include but are not limited to corn, soybean, sunflower, olive, safflower, palm and coconut.

As previously mentioned, it is understood that any strong base is suitable for use in emulsifying the oil mixture. It is also understood that the selected emulsifier also acts to partially neutralize the tall oil/vegetable oil mixture. The extent of neutralization should be sufficient to provide the beneficial characteristics of the composition as applied to a desired road surface without excessive foaming.

The composition, as a concentrate, has a distinctive odor and light yellow color. It has a pH preferably of about 6–8, most preferably about 7–8, a specific gravity of about 1.0 and is non-volatile. The composition is stable at ambient conditions and has a typical viscosity of about 120 cp @70° F.

The composition can be used on a wide variety of surfaces for the purposes of dust control and surface stabilization. Typical application rates are about 1.5 L of diluted product per square meter. The composition can be applied on gravel construction roads, gravel industrial roads, gravel pits, service roads, seismic roads, rural roads, access roads, driveways, gravel parking lots, storage lots, semi-permanent flooring, mine sites, drill sites and virtually any other desired surface. As used on gravel roads, application of the dust control composition of the present invention provides rapid control of respirable dust clouds. It provides excellent wetting and binding characteristics. As a preventative dust maintenance measure, it is cost effective both in the short and with long term usage. The composition penetrates and extends bonding into a surface, such as gravel, by providing cohesion, preventing sediment wash-out and increasing the load-bearing capacity of unpaved road surfaces.

Furthermore, the composition as applied to a gravel bed for example, provides a reduction of aggregate loss, enhances conservation of native gravel, provides safety to motorists and delivers effective dust control.

As applied to a gravel road, it is recommended that the gravel road first be scarified to at least two inches and the loose gravel material should be well graded. The gravel surface should not have soft spots and frost boils as they tend to unevenly accumulate the product and reduce its effectiveness. Any such problem areas first require base stabilizing treatments. The gravel road surface should ideally be moist. The composition is best applied sprayed utilizing any type of spray arm as attached to a tanker truck. The optimum application temperature ranges from between about 70 to 80° F. The warmer the gravel surface the faster the penetration. Typically, two spray applications are recommended for dust control.

The composition of the present invention is formulated as a dust suppressant product. Alternatively, the composition can be formulated to be used to provide extended bonding into a road surface in order to prevent sediment wash-out and to increase the load-bearing capacity of the road surface. In this manner, the composition is used to compact road surfaces and make them generally more durable and safe through improved visibility from dust clouds.

The composition is environmentally friendly. It is biodegradable and causes neither toxic leaching nor adversely affects vegetation, aquatic life or other living organisms. It does not deposit toxic residues in soils which is highly advantageous compared to waste petroleum oil based compositions or latex products commonly used in dust control.

The invention is further illustrated by the following examples.

Example 1

In one formulation, according to an aspect of the invention, tall oil is placed into a 3000 gallon tank having mixing paddles at a vertical axis. Tall oil is first added and high shear is applied by virtue of the mixing paddles in order to modify the viscosity of the tall oil. Canola oil is then added in a ratio of 80:20 tall oil to canola oil. The combination of oils is then blended. The blended mixture of oils is then emulsified with a ratio of about 57.5:40 with water by adding a KOH solution in water. The KOH solution is about 4.16% by weight KOH in water and is present in a ratio of about 2.5 to the blended oil and water mixture. The KOH also acts to partially saponify the oil mixture.

The concentrated mixture is further dilutable and is then sprayed at 35–45 psi to a desired surface at a rate of 1.5 L per square meter.

Example 2

In a second formulation, a 80:20 ratio of tall oil to canola oil is placed into a 3000 gallon tank having mixing paddles rotating about a vertical axis and the mixture blended together. The blended mixture of oils is then emulsified with a ratio of about 57.5:40 with water by adding a KOH solution in water. The KOH solution is about 4.16% by weight KOH in water and is present in a ratio of about 2.5 to the blended oil and water mixture. The KOH also acts to partially saponify the oil mixture.

The concentrated mixture is further dilutable and is then sprayed at 35–45 psi to a desired surface at a rate of 1.5 L per square meter.

Although preferred embodiments of the present invention have been described herein, those of skill in the art will appreciate that variations and modifications may be made without departing from the spirit and scope thereof as defined by the appended claims.

What is claimed is:

1. A stable concentrated dust control composition comprising:
    a mixture of crude tall oil and vegetable oil emulsified in water, wherein said crude tall oil is present in an amount anywhere from about 5% to 95% and the balance of the oil being anywhere from about 5% to 95% of vegetable oil; and
    about up to 10% by weight oil mixture of a base to partially saponify the mixture of crude tall oil and vegetable oil, said base being selected from the group consisting of potassium hydroxide and sodium hydroxide.

2. The composition of claim 1, wherein said composition is diluted in a range of ratios of about 40:60 to about 25:75 with water.

3. The composition of claim 1, wherein said vegetable oil is selected from the group consisting of canola, corn, soybean, sunflower, olive, safflower, palm, peanut and coconut.

4. A stable concentrated dust control composition comprising;
    a mixture of about 80% of crude tall oil and about 20% vegetable oil emulsified in a range of ratios of about 40:60 to about 25:75 oil mixture to water with up to about 4% to about 6% by weight of the oil mixture being of a base selected from the group consisting of potassium hydroxide and sodium hydroxide.

5. The composition of claim 4, wherein said vegetable oil is selected from the group consisting of canola, corn, soybean, sunflower, olive, safflower, palm, peanut and coconut.

6. The composition of claim 5, wherein said vegetable oil is canola oil.

7. The composition of claim 4, wherein said composition has a pH of about 8 to 8.9.

8. The composition of claim 4, wherein said composition has a specific gravity of about 1.0.

9. The composition of claim 4, wherein said composition has a viscosity of about 120 cp @ 70° F.

10. A method for making a stable dust control composition comprising:
    providing a mixture of oils of up to about 95% crude tall oil and the balance being vegetable oil;
    emulsifying said mixture in a range of ratios of about 40:60 to about 25:75 with water using up to about 4% to about 6% by weight of the oil mixture with a base selected from the group consisting of potassium hydroxide and sodium hydroxide to provide a stable emulsion.

11. The method of claim 10, wherein said method additionally comprises further diluting the stable emulsion with additional water.

12. The method claim 11, wherein said vegetable oil is selected from the group consisting of canola, corn, soybean, sunflower, olive, safflower, palm, peanut and coconut.

13. The method of claim 10, wherein said vegetable oil is canola oil.

14. A method for creating a dust free, safe compact surface, said method comprising the steps of;
    applying to a desired surface a mixture of oils of up to about 95% of crude tall oil and the balance being vegetable oil emulsified in a range of ratios of about 40:60 to about 25:75 oil mixture to water with up to about 4% to about 6% by weight of the oil mixture of base selected from the group consisting of potassium hydroxido and sodium hydroxide.

15. The method of claim 14, wherein said vegetable oil is selected from the group consisting of canola, corn, soybean, sunflower, olive, safflower, palm and coconut.

16. The method of claim 15, wherein said vegetable oil is canola oil.

17. The method of claim 14, wherein said mixture is applied at about 1.5 L of mixture per square meter of surface.

* * * * *